United States Patent
Stautmeister et al.

(10) Patent No.: US 7,561,273 B2
(45) Date of Patent: Jul. 14, 2009

(54) DEVICE AND METHOD FOR MEASUREMENT OF SURFACES

(75) Inventors: Torsten Stautmeister, Dresden (DE); Bernhard Messerschmidt, Jena (DE); Karl Wisspeinter, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 11/939,234

(22) Filed: Nov. 13, 2007

(65) Prior Publication Data

US 2008/0130013 A1 Jun. 5, 2008

Related U.S. Application Data

(63) Continuation of application No. PCT/DE2006/000800, filed on May 10, 2006.

(30) Foreign Application Priority Data

May 17, 2005 (DE) ........................ 10 2005 023 351

(51) Int. Cl.
*G01N 21/55* (2006.01)
(52) U.S. Cl. ........................................ 356/445
(58) Field of Classification Search .................. 356/445
See application file for complete search history.

(56) References Cited

U.S. PATENT DOCUMENTS

| | | | |
|---|---|---|---|
| 5,785,651 A | | 7/1998 | Kuhn et al. |
| 6,208,465 B1 | | 3/2001 | Schaham |
| 6,674,572 B1 | * | 1/2004 | Scheruebl et al. ........... 359/368 |
| 7,414,740 B2 | * | 8/2008 | Wilke et al. ................. 356/632 |
| 2004/0109170 A1 | | 6/2004 | Schick |
| 2006/0109483 A1 | * | 5/2006 | Marx et al. ................. 356/609 |

FOREIGN PATENT DOCUMENTS

| | | |
|---|---|---|
| EP | 1 398 597 A1 | 3/2004 |
| WO | WO 2005/121700 A1 | 12/2005 |

OTHER PUBLICATIONS

Hasman et al., "Color-Coded Optical Profilometry with >10⁶ Resolved Depth Steps," *Applied Optics*, Apr. 1, 2001, vol. 40, No. 10, pp. 1609-1616.
Tan et al., "Differential Confocal Optical System Using Gradient-Index Lenses," *Optical Engineering*, Oct. 2003, vol. 42, No. 10, pp. 2868-2871.
International Search Report for International Application No. PCT/DE2006/000800, completed Jul. 28, 2006.

* cited by examiner

*Primary Examiner*—Roy Punnoose
(74) *Attorney, Agent, or Firm*—Alston & Bird LLP

(57) ABSTRACT

The invention relates to a device for measuring surfaces and to a method, which uses, preferably, the device. The device comprises a light source which is used to produce a multi-colored light beam. The light beam can be focused by an imaging optical system on a plurality of points which are arranged at different distances from the imaging optical system, using the chromatic aberration of the optics. The focused light beam can be deviated to a point of the surface. A sensor device is provided in order to detect the reflected light beam. The aim of the invention is to maintain the largest distance possible between the measuring head and the object. The imaging optical system comprises an optical system for the targeted circulation of a chromatic aberration and an additional optical system which is used to form the focused light beam emerging from the imaging optical system.

18 Claims, 2 Drawing Sheets

DEVICE AND METHOD FOR MEASUREMENT OF SURFACES

CROSS REFERENCE TO RELATED APPLICATION

The present application is a continuation of international application PCT/DE2006/000800, filed 10 May 2006, and which designates the U.S. The disclosure of the referenced application is incorporated herein by reference.

BACKGROUND OF THE INVENTION

The invention concerns a device for measurement of surfaces and a method for operation of a device, in which the device has a light source to generate a multicolor light beam, the light beam being focusable by imaging optics, using chromatic aberration of the optics, on several points at different distance from the imaging optics, in which the focused light beam can be controlled on the surface and a sensor device is provided to detect the reflected light beam.

In many areas of engineering it is important to have precise knowledge concerning the condition of surfaces. Burrs or waviness of the surface that can form during production of objects are only tolerable in many applications in very narrow limits. Especially in high-precision mechanisms with moving parts, insufficient surface quality can lead to improper function or rapid destruction. In addition to gaining information on the quality of the surface, in many areas, precise measurement of structures in a surface is required. For example, in many applications, it is of interest to know the depths and position of millings or holes in a work piece.

Different methods for measuring surfaces are known from practice. In one possible method, two or more cameras are used, with which information concerning the three-dimensional condition of the surface is calculated by triangulation. However, only very restricted measurement accuracies can be achieved with such measurement systems.

In another method known from practice, a monochromatic light beam is guided to a surface being investigated, in which the light beam is always focused on the surface. If a distance between the optics and the illuminated image point changes as a result of surface unevenness and the light beam is therefore no longer focused on the surface, an automatic focusing circuit regulates the optics, so that the light beam is refocused on the surface. From the degree of adjustment of the optics, the distance change can be determined. In this way, the surface can be measured relatively precisely, but the measurement speed is severely restricted because of necessary adjustment of the optics. Measurement of the surface in a running production process is therefore not feasible.

To avoid this adjustment, a method is known, with which surfaces can be measured by the use of multicolor light (mostly white light) and using chromatic aberration. The fact that the focus of the imaging optics depends on the wavelength of the light is utilized in this case. If a light beam focused on several foci impinges on a surface, the light beam is reflected from it. The spectral fractions, whose focus was not in the region of the surface during reflection, are essentially suppressed or blocked out via an aperture device or glass fiber. Because of this, the distance of the optics from the illuminated point of the surface can be determined by spectral analysis of the light beam processed in this way. Relatively large measurement speeds can be achieved, but the spacing between the optics and the measurement object is subject to very sharp restrictions. During use of lenses with very short focal lengths, during a spacing change to the surface of the object being measured, a relatively strong shift in the detected spectrum is obtained and therefore relatively high measurement accuracy or resolution, but the attainable measurement distance is significantly reduced—i.e., the distance between the sensor and the object being measured. If lenses with a larger focal length are used, larger measurement spacings and measurement areas can be achieved, but the measurement accuracy or resolution of the arrangement significantly diminishes.

The underlying task of the present invention is therefore to configure and modify a device of the type just mentioned, so that a high-resolution measurement of surfaces, as quickly and simply as possible, can be achieved with the largest possible distance between the optics and the measurement object and the simplest design of the measurement device at the same time. In addition, a corresponding method is to be provided.

SUMMARY OF THE INVENTION

The above objectives and others are realized according to the invention by providing, in one embodiment, a device for measurement of surfaces, comprising a light source for generating a multicolor light beam, in which the light beam can be focused by imaging optics on several points at different distances from the imaging optics utilizing chromatic aberration of the optics, in which the focused light beam can be guided on a surface, and in which a sensor device is provided to detect the reflected light beam, wherein the imaging optics includes optics for targeted creation of a chromatic aberration, and additional optics to influence the beam path of the focused light beam emerging from the imaging optics.

Accordingly, the device in question is configured so that the imaging optics has optics for targeted achievement of chromatic aberration and additional optics to influence the beam path of the light emerging from the imaging optics.

In another embodiment, the present invention provides a method for measurement of surfaces, comprising focusing a light beam on several points at different distances from imaging optics using chromatic aberration of the optics, in which the focused light beam is directed to a point of a surface, and in which a sensor device is provided to detect the reflected light beam, wherein in the imaging optics, an optics is used for targeted creation of chromatic aberration, and additional optics is used to influence the beam path of the focused light beam emerging from the imaging optics.

The method in question is characterized by the fact that optics for deliberate production of chromatic aberration and additional optics to influence the beam path of the focused light beam emerging from the imaging objects are used in the imaging optics.

It was initially recognized, in the manner according to the invention, that to achieve the highest possible resolution and the largest possible measurement distance, a coupled solution to both problems need not necessarily be used. This means that an increase in resolution, i.e., an increase in chromatic aberration, even without a reduction in measurement distance, is possible and vice-versa. It was also recognized according to the invention that the two problems can be coupled, in that the imaging objects are constructed from two optics that can be optimized independently of each other. The imaging optics according to the invention therefore consists of optics for deliberate creation of chromatic aberration and additional optics to influence the beam path of the light beam emerging from the imaging optics. Because of this, strong chromatic aberration can be created particularly simply and independently by means of the first optics, whereas focusing of the light beam can be influenced by the second optics. As a result, a focused light beam can be generated that has high chromatic splitting of the focal point and, at the same time, is focused on a point lying relatively far from the imaging optics. If the most compact possible optics of the sensor is also to be achieved, the chromatic aberration can be produced deliberately by particularly small first optics. The second optics can be used to produce a high numerical aperture and therefore high resolution with simultaneously large measurement spacings. Only the second optics therefore need have a corresponding size, whereas the first optics can be arbitrarily miniaturized.

In a particularly preferred embodiment of the invention, the first optics is assigned a device for influencing chromatic aberration of this optics. All methods known from practice can be used for this purpose.

To achieve particularly high-chromatic aberration, the first optics can advantageously be implemented by a GRIN (gradient index) lens. GRIN lenses have a relatively arbitrary geometric structure and are characterized by a trend of the refractive index perpendicular to the direction of propagation of the light beam. GRIN lenses are generally constructed cylindrical, in which the light beams enter or emerge on the base and cover surfaces of the cylinder. At least one 1.0 pitch GRIN lens is preferably used in the device according to the invention. This means that a monochromatic light beam in the interior of the lens describes a period of a sine oscillation. The trend of the refractive index and the length of the lens must be tuned to each other for this purpose. In a multicolor light beam, a specific spectral fraction of the light beam, generally the middle wavelength of the spectrum of the light beam, is used for dimensioning of the lens.

GRIN lenses possess the property that the chromatic aberration becomes greater with increasing length. While a light beam passes through a GRIN lens, intermediate images invariably form again on the focal points of the lens, in which each intermediate image has a greater splitting of the spectral fractions than the preceding one. This effect could be utilized in that a larger than 1.0 pitch GRIN lens is used to generate a particularly strong aberration, i.e., a GRIN lens, in whose interior the light beam describes more than one sine oscillation. Lenses, whose lens lengths are a multiple of a half-period (0.5 pitch) are preferred. The longitudinal chromatic aberration can then be scaled without altering the other optical parameters, like imaging scales or focal lengths of the entire system. Depending on the requirements of the entire device, however, use of other relatively arbitrary lengths of the GRIN lens is also conceivable.

To influence the base spacing (minimal measurement distance) or measurement range of a sensor device, a correcting device can be assigned to the GRIN lens, with which the spacing between the GRIN lens and a glass fiber or aperture device can be established. This correcting device could, in the first place, have a fixed length and therefore assume the function of a spacer. In the second place, it could be configured with variable length. A correcting device of fixed length can be constructed from glass or a transparent plastic, a correcting device of variable length could include an air gap or gel and an appropriate adjustable holding device. However, all appropriate methods and devices known from practice are usable.

Advantageously, the second optics can be constructed by a lens system, preferably telescope optics, with at least one lens, in which one or more aspherical lenses are preferably used. It is then conceivable that during use of several lenses, at least two lenses have the same focal length, or all lenses have different focal lengths. By means of the second optics, a 1:1 imaging can be achieved, but also magnifying or reducing images would be conceivable. Depending on the type of imaging, the measurement ranges and base spacings lie closer to the optics or farther from them.

With respect to particularly variable use of the device according to the invention, a change in measurement range could be achieved by replaceability of one of the lenses of the optics.

As required, a device to deflect the light beam could be used between two lenses of the optics. On this account, the device can advantageously be adapted to special geometric circumstances. For this purpose, for example, a glass fiber, prism or prism optics with several prisms and spacers could be used. This device for deflection of the light beam, however, could also be assigned to the first optics or arranged between the first and second optics.

As an alternative or in addition, the light beam emerging from the imaging optics could be guided through a deflection device. In this case, the light beam would be guided to the surface. For this purpose, prisms, mirrors, plane-parallel plates or other direction-changing devices known from practice could be prescribed. To control the light beam at a certain location of the surface and to achieve the most comprehensive possible covering of the surface being measured, the deflection device or at least part of it could be configured movable in a two- or three-dimensional movement. Rotational or tilting movements around different axes, linear movements with different movement directions or combinations of these could then be used.

With respect to the best possible reproducibility of a measurement, the movements of the deflection device could be accomplished by electrical correcting elements. These correcting elements could be controlled by an electronic device, preferably a microcontroller or other digital computer.

The light beam reflected on the surface and processed by the aperture device or the glass fiber can finally be fed to a sensor device for detection of this light beam. With an additional electronic circuit, for example, a microcontroller or another digital computer, a distance between the measured object and the optics could be calculated from the spectrum of the received light beam. The reference data necessary for this, i.e., the assignments between wavelengths and distances, can be determined before startup of the device for calibration measurements and made available to the electronic device.

In particularly advantageous fashion, by using a GRIN lens in conjunction with additional optics, an imaging optics can be constructed that is relatively freely parametrizable and very strongly miniaturizable. Measurement heads with very small diameters can be implemented on this account.

By an arrangement of several, preferably very strongly miniaturized imaging optics according to the invention or by using a beam splitter, a surface sensor can be constructed simply. Because of this, several measurements can be conducted simultaneously. Depending on the requirements and configuration the surface sensor, the measurement points can lie on different curves, for example, a line segment, a circular sector or a sector of a hyperbole. The construction of a two-dimensional, for example, rectangular, array would also be conceivable.

By focusing the light beam on a series of points, using chromatic aberration, and by increasing the measurement spacing and range, objects that are coated with a layer of transparent material could also be advantageously be measured. A spectral fraction of the light beam is then already reflected at the interface to the coating, whereas another fraction is reflected on the surface itself. Because of this, two spectral fractions can be detected with the sensor device, each of which has two spacings. The condition of the surface can be determined simultaneously from these spacings and the thickness of the coating determined by subtraction of the two values.

There are now different possibilities of configuring and modifying the teachings of the present invention advantageously.

BRIEF DESCRIPTION OF THE DRAWINGS

Figure 1:
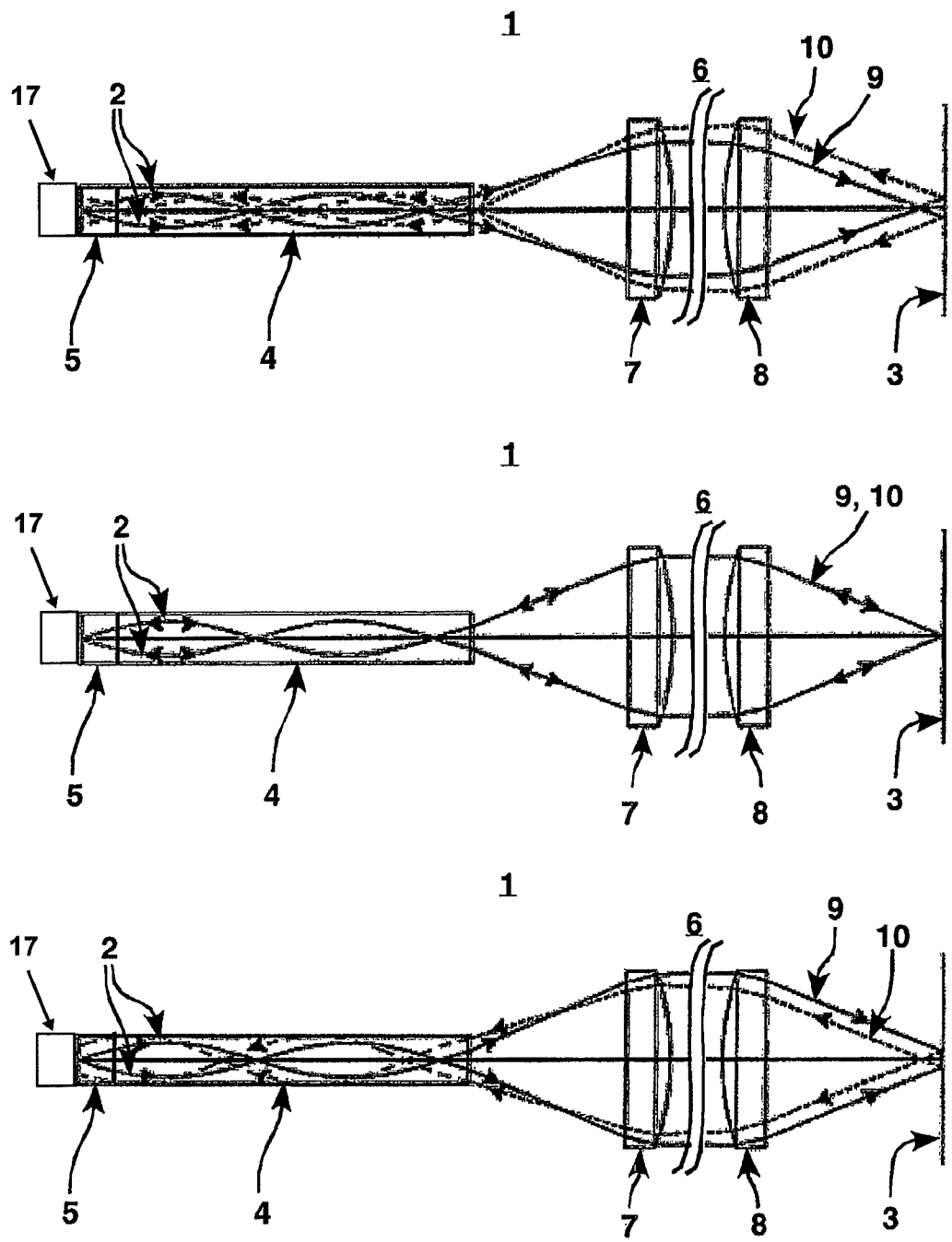
Figure 2:
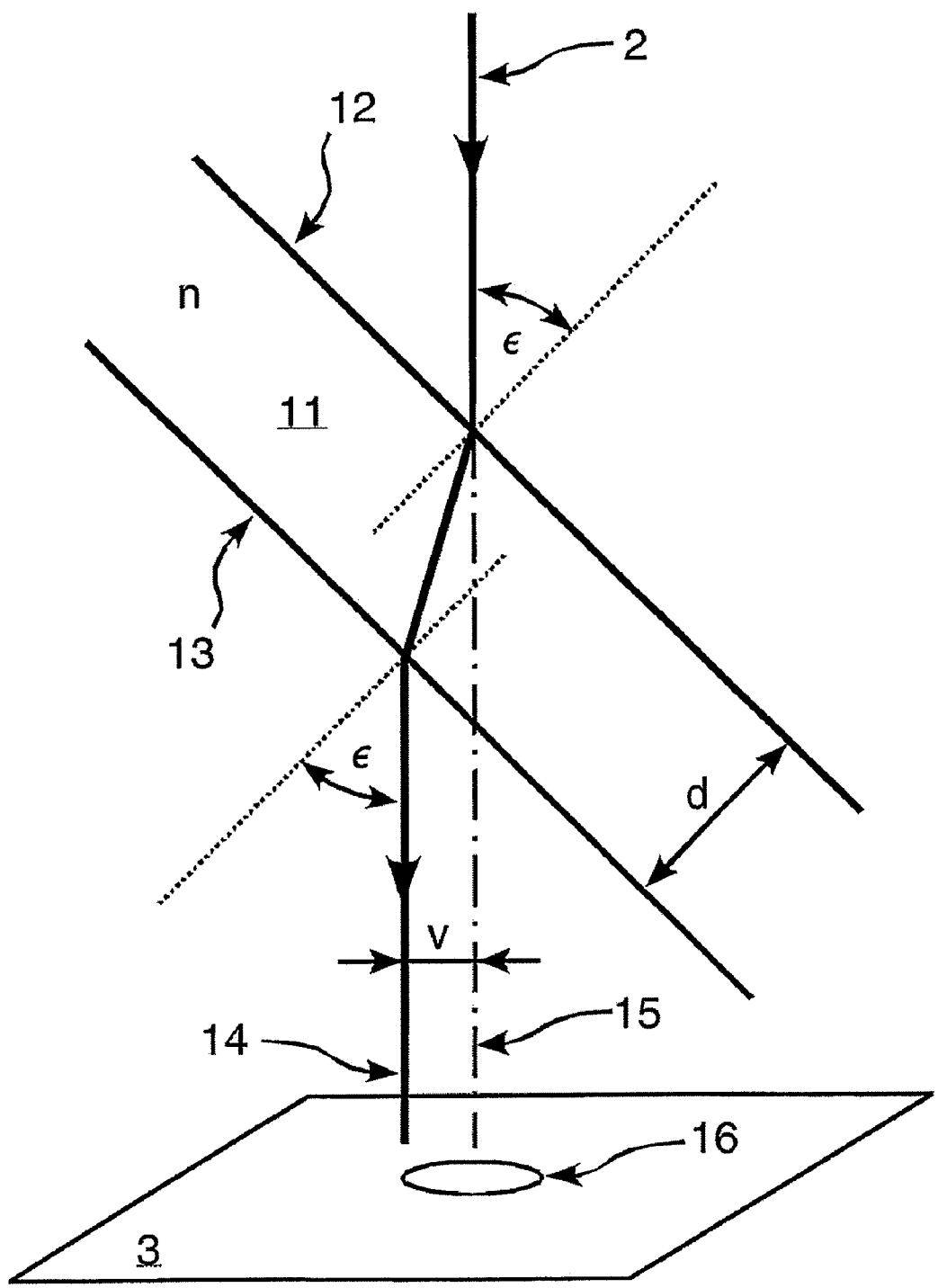

Having thus described the invention in general terms, reference will now be made to the accompanying drawings, which are not necessarily drawn to scale, and wherein:

FIG. 1 schematically depicts the principal trend of light beams in different wavelengths through an imaging optics according to one embodiment of the invention; and FIG. 2 schematically depicts an embodiment of the deflection device through a plane-parallel plate.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

The beam path of a multicolor light beam 2 through the imaging optics 1 according to the invention is shown in FIG. 1. The upper part of the figure shows the preparation of a short-wave fraction of light beam 2, whereas the beam path of a long-wave fraction is shown in the lower part of the figure. In the middle part, the spectral fraction of the light beam 2 is shown, which is focused exactly on surface 3, and whose wavelength therefore assumes a value that lies between the values of the fractions shown in the upper and lower parts of the figure. The emitted and reflected light beam then takes the same path, only in the opposite direction.

The first part of the imaging optics 1 consists of a GRIN lens 4, which is connected to a correcting device 5 (a so-called spacer) to influence the length of the optical system. A glass fiber (not shown here) is arranged directly on the correcting device 5 on the side facing away from GRIN lens 4, via which the multicolor light beam 2 is coupled into the correcting device 5 and GRIN lens 4 and coupled out again. The light beam that is coupled via the glass fiber and passes through the GRIN lens leaves the GRIN lens 4 and encounters the second lens 6 of the imaging optics 1, which consists of two aspherical lenses 7 and 8 with the same focal length.

The focused light beam 9 leaves the imaging optics 1, impinges on surface 3 and is reflected on it. The reflected light beam 10 (drawn with a dashed line in the figure) passes through the imaging optics in the same manner as the incident light beam 2 and is filtered through the glass fiber (not shown). At an appropriate site, for example in some embodiments, using an optical divider, the light beam is coupled out and fed to a sensor device 17. The optical divider is not contained in the figure.

It is readily apparent in FIG. 1 that the light beam 10 reflected on surface 3 leaves the correcting device 5 in a differently extended range. If a glass fiber is situated on the end facing away from the GRIN lens, only the fraction of the light beam, whose focus lies at the coupling site between the correcting device 5 and glass fiber, is well coupled into the fiber. This applies precisely for the spectral fractions that were focused on surface 3. Because of this, the spectral fractions that are focused on the surface are essentially detected by the sensor device.

FIG. 2 shows an embodiment of the deflection device through a plane-parallel plate 11 that permits the use of the device according to the invention as a surface scanner. A light beam 2 impinges on the obliquely positioned plane-parallel plate 11, and the beam is refracted at the interfaces 12 and 13 as a result of the increased refractive index n relative to the surroundings. Because of this, a parallel shift v is produced for the light beam, which depends on the thickness d and the refractive index n of the plane-parallel plate 11 and the angle of incidence ε of the incident light beam 2. The shift v can be calculated by:

$$v = d \cdot \sin\varepsilon \cdot \left(1 - \frac{\cos\varepsilon}{\sqrt{n^2 - \sin^2\varepsilon}}\right)$$

from the law of refraction and geometric considerations.

If the plane-parallel plate 11 rotates around axis 15, the parallel-shifted light beam 14 describes a circle 16 on surface 3. If, in addition, the angle ε, i.e., the slope angle of the parallel-plate 11, is influenced, the radius of circle 16 also changes. Surface 3 can therefore be scanned in circular fashion. If the plane-parallel plate 11 changes only in its slope angle, the surface 3 can be scanned linearly.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for measurement of surfaces, comprising:
 a light source for generating a multicolor light beam, in which the light beam is focused by imaging optics on several points at different distances from the imaging optics utilizing chromatic aberration of the optics, in which the focused light beam is guided on a surface, and in which a sensor device is provided to detect the reflected light beam,
 wherein the imaging optics includes optics including a GRIN lens for targeted creation of a chromatic aberration, and additional optics to influence the beam path of the focused light beam emerging from the imaging optics.

2. The device according to claim 1, wherein the optics includes a device for influencing the chromatic aberration.

3. The device according to claim 1, wherein the GRIN lens has a length of greater than one pitch length.

4. The device according to claim 1, wherein the GRIN lens includes a correcting device to influence at least one of an imaging scale or a measurement range.

5. The device according to claim 4, wherein the correcting device has a fixed length.

6. The device according to claim 4, wherein the correcting device can be influenced in its length.

7. The device according to claim 1, wherein the additional optics is constructed for at least one lens.

8. The device according to claim 1, wherein the additional optics has one or more aspherical lenses.

9. The device according to claim 7, wherein at least two lenses in the additional optics have the same focal length with two or more lenses.

10. The device according to claim 7, wherein the additional optics has two or more lenses, all having different focal lengths.

11. The device according to claim 7, wherein at least one lens of the additional optics is configured replaceable.

12. The device according to claim 7, wherein the additional optics makes a 1:1 image.

13. The device according to claim 7, wherein glass fibers are arranged between the lenses of the additional optics.

14. The device according to claim 7, wherein a prism is arranged between the lenses of the additional optics.

15. The device according to claim 1, wherein a deflection device is provided to deflect a light beam.

16. The device according to claim 15, wherein the deflection device comprises one of a prism, a mirror, a plane-parallel plate or other direction-changing device.

17. The device according to claim 15, wherein the deflection device is controllable via electrical correcting elements.

18. A method for measurement of surfaces, comprising:
focusing a light beam on several points at different distances from imaging optics using chromatic aberration of the optics, in which the focused light beam is directed to a point of a surface, and detecting the reflected light beam using a sensor device,
wherein in the imaging optics, an optics including a GRIN lens is used for targeted creation of chromatic aberration, and additional optics is used to influence the beam path of the focused light beam emerging from the imaging optics.

* * * * *